United States Patent
Amagasa et al.

(10) Patent No.: US 9,660,566 B2
(45) Date of Patent: May 23, 2017

(54) MOTOR CONTROL METHOD AND MOTOR CONTROL DEVICE

(71) Applicant: MITSUBA Corporation, Gunma (JP)

(72) Inventors: Toshiyuki Amagasa, Gunma (JP); Ken Hirata, Gunma (JP); Takeshi Ikeda, Gunma (JP)

(73) Assignee: MITSUBA CORPORATION, Gunma (JP)

( * ) Notice: Subject to any disclaimer, the term of this patent is extended or adjusted under 35 U.S.C. 154(b) by 0 days.

(21) Appl. No.: 14/897,383

(22) PCT Filed: Jun. 30, 2014

(86) PCT No.: PCT/JP2014/067317
§ 371 (c)(1),
(2) Date: Dec. 10, 2015

(87) PCT Pub. No.: WO2015/002122
PCT Pub. Date: Jan. 8, 2015

(65) Prior Publication Data
US 2016/0134223 A1    May 12, 2016

(30) Foreign Application Priority Data
Jul. 4, 2013   (JP) ................................ 2013-140587

(51) Int. Cl.
*H02P 7/00* (2016.01)
*H02P 29/00* (2016.01)
*B60S 1/08* (2006.01)

(52) U.S. Cl.
CPC ............... *H02P 29/00* (2013.01); *B60S 1/08* (2013.01); *H02P 2205/07* (2013.01)

(58) Field of Classification Search
CPC ...... B60W 30/43; H02P 2205/07; H02P 29/00
See application file for complete search history.

(56) References Cited

U.S. PATENT DOCUMENTS

| 5,225,752 A | 7/1993 | Yasuda et al. |
| 2010/0129129 A1* | 5/2010 | Katayama ............. B41J 11/008 400/582 |

FOREIGN PATENT DOCUMENTS

| EP | 1 449 728 | 8/2004 |
| JP | 4-24148 | 1/1992 |

(Continued)

OTHER PUBLICATIONS

Notification of Transmittal of Translation of the International Preliminary Report on Patentability issued Jan. 14, 2016 in corresponding International Application No. PCT/JP2014/067317.

(Continued)

*Primary Examiner* — Karen Masih
(74) *Attorney, Agent, or Firm* — Wenderoth, Lind & Ponack, L.L.P.

(57) ABSTRACT

A system has an acceleration region SU and a deceleration region SD between operation start and end positions of a wiper arm. In the acceleration region and the deceleration region, an addition amount and a subtraction amount are calculated, respectively, based on a difference between a maximum rotation speed and a current rotation speed to update a target rotation speed. The addition amount is larger than the subtraction amount, and a constant speed region CV is between the acceleration region SU and the deceleration region SD. When a change amount of an operation angle of the wiper arm does not exceed the constant speed region CV, the operation angle change amount is subtracted from the constant speed region. Further, when the operation angle change amount exceeds the constant speed region CV, the target rotation speed is updated by the same change amount.

12 Claims, 10 Drawing Sheets

(56) References Cited

FOREIGN PATENT DOCUMENTS

| | | |
|---|---|---|
| JP | 2010-173338 | 8/2010 |
| JP | 2013-1237 | 1/2013 |
| JP | 2013-14295 | 1/2013 |
| WO | 2007/042515 | 4/2007 |
| WO | 2008/049536 | 5/2008 |

OTHER PUBLICATIONS

International Search Report issued Sep. 2, 2014 in corresponding International Application No. PCT/JP2014/067317 (with English translation).

* cited by examiner

Fig. 2

| Input signal pattern | Control parameter | |
|---|---|---|
| Wiper switch signal - Lo<br><br>Hood open/close signal<br>                       - Close<br><br>Car speed signal - 60 km/h | Maximum rotation speed | 65 |
| | Operation start position | 0 |
| | Operation end position | 150 |
| | Addition amount | $1/X1$ |
| | Subtraction amount | $1/(X2-1)$ |
| ⋮ | ⋮ | |
| ⋮ | ⋮ | |

(a)

(b)

MOTOR CONTROL METHOD AND MOTOR CONTROL DEVICE

TECHNICAL FIELD

The present invention relates to electric motor control technology and, more particularly, to control technology of a motor used as a drive source of a wiper device provided in a vehicle such as a car.

BACKGROUND ART

A vehicle such as a car is provided with a wiper device that wipes off rain drops adhered to a windshield or splash from a preceding car so as to secure a driver's visibility in rainy weather. The wiper device has a wiper arm whose swinging is controlled by a wiper driving device. A wiper blade that abuts against the windshield is attached to a leading end of the wiper arm. The wiper arm is swung by converting rotary motion of a motor into reciprocating motion by a link mechanism. The reciprocating motion of the wiper arm causes the wiper blade to perform wiping operation on the windshield.

It is known that the wiper device provided in a car or the like has a system that detects a current position of the wiper arm on a glass surface and makes the wiper blade perform reciprocal wiping operation between upper/lower inversion positions based on the detected data (see, for example, Japanese Application Publication 2010-173338). In such a wiper device, in controlling the operation of the wiper arm, an arm target speed is set corresponding to an angular position of the wiper arm. A wiper control device detects the current position of the wiper arm and then feedback-controls a wiper motor based on the arm current position and target speed to make the wiper blade perform reciprocal wiping operation between upper/lower inversion positions.

Further, as to the operation control of the wiper device, Japanese Application Publication 2013-14295 discloses a system that sets an acceleration region and a deceleration region in one-way (forward path or backward path) wiping operation so as to achieve smooth wiping operation without a sense of incongruity.

In the acceleration region, a difference between a maximum rotation speed of the motor and target speed of the motor at the current angle is calculated every time the angular position of the arm advances. Then, a next target speed is set by adding 1/x of the calculated difference to the current target speed. In the deceleration region, a next target speed is set by subtracting 1/(x−1) of the above calculated difference from the current target speed. In setting the next target speeds, for achieving smooth wiping operation without a sense of incongruity, the addition amount and subtraction amount of the speed are set such that a target speed curve at acceleration time and that at deceleration time are approximately symmetric.

However, in actual wiping operation, a load amount of the motor is not always equal over the entire wiping range depending on a condition of a surface of the windshield or due to influence of traveling wind. Thus, when the target speed curves at the acceleration and deceleration times are symmetric, unevenness may occur in a blade moving speed in continuous reciprocating operation, which may prevent achievement of the smooth wiping operation without a sense of incongruity.

Summary of the Invention

According to the present invention, there is provided a motor control method used in a system, the system operating an object to be controlled by a motor and being configured such that an acceleration region and a deceleration region for the operation of the object to be controlled are set between operation start and end positions of the object to be controlled. When the object to be controlled is moved from the operation start position to operation end position, a deceleration start position from which the deceleration region is started is calculated from information of the operation start and end positions. In the acceleration region, an addition amount to be added to a current target rotation speed of the motor is calculated from a difference between a maximum rotation speed of the motor and a current rotation speed of the motor and addition amount information concerning the rotation speed of the motor, and the motor is accelerated so as to be rotated at the target rotation speed until it is detected that the deceleration start position is reached while the target rotation speed is sequentially updated by the addition amount. In the deceleration region, at a time point when it is detected that the deceleration start position is reached, a subtraction amount to be subtracted from the current target rotation speed of the motor is calculated from a difference between the maximum rotation speed of the motor and the current rotation speed of the motor and subtraction amount information concerning the rotation speed of the motor, and the motor is decelerated so as to be rotated at the target rotation speed until it is detected that the operation end position is reached while the target rotation speed is sequentially updated by the subtraction amount. The addition amount information and the subtraction amount information are set such that the addition amount in the acceleration region is larger than the subtraction amount in the deceleration region.

In the motor control method, a constant speed region over which the maximum rotation speed is not changed may be provided between the acceleration region and the deceleration region, the constant speed region being able to be changed in length. In this case, when an operation distance from the operation start position to operation end position is changed, and the change amount does not exceed the constant speed region, the change amount of the operation distance may be subtracted from the constant speed region. On the other hand, when an operation distance from the operation start position to the operation end position is changed, and the change amount exceeds the constant speed region, the target rotation speed may be updated by the same change amount both in the acceleration and deceleration regions. In this case, the target rotation speed of the motor in each of the acceleration and deceleration regions may be calculated based on the subtraction amount information, and the target rotation speed may be updated by the calculated value. Further, the object to be controlled may be a wiper device provided in a vehicle.

According to the present invention, a motor control device is provided in a system, the system operating an object to be controlled by a motor and being configured such that an acceleration region and a deceleration region for the operation of the object to be controlled are set between operation start and end positions of the object to be controlled. The motor control device includes: a parameter storage section that stores parameters required for the motor control, the parameters including information of the operation start position and the operation end position, maximum rotation speed information of the motor, addition amount and subtraction amount information of the rotation speed; a position detector that detects a position of the object to be controlled; and a drive controller that acquires the parameters from the parameter storage and controls a drive state of the motor. The drive controller calculates, when the object to be controlled is moved from the operation start position to the operation end position, a deceleration start position from which the deceleration region is started from the information of the operation start and end positions. In the acceleration region, the drive controller calculates an addition amount to be added to a current target rotation speed of the motor from a difference between the maximum rotation speed of the motor and a current rotation speed of the motor and the addition amount information concerning the rotation speed of the motor and accelerates the motor so as to rotate the motor at the target rotation speed until it is detected that the deceleration start position is reached while updating the target rotation speed sequentially by the addition amount.

In the deceleration region, at a time point when it is detected that the deceleration start position is reached, the drive controller calculates a subtraction amount to be subtracted from the current target rotation speed of the motor from a difference between the maximum rotation speed of the motor and current rotation speed of the motor and the subtraction amount information concerning the rotation speed of the motor and decelerates the motor so as to rotate the motor at the target rotation speed until it is detected that the operation end position is reached while updating the target rotation speed sequentially by the subtraction amount. The addition amount information and the subtraction amount information are set such that the addition amount in the acceleration region is larger than the subtraction amount in the deceleration region.

In the motor control device, a constant speed region over which the maximum rotation speed is not changed may be provided between the acceleration and deceleration regions of the motor, and a length of the constant speed region may be changed by the drive controller. In this case, when an operation distance from the operation start position to the operation end position is changed, and the change amount does not exceed the constant speed region, the drive controller may subtract the change amount of the operation distance from the constant speed region. On the other hand, when an operation distance from the operation start position to the operation end position is changed, and the change amount exceeds the constant speed region, the drive controller may update the target rotation speed by the same change amount both in the acceleration and deceleration regions. In this case, the drive controller may calculate the target rotation speed of the motor in each of the acceleration and deceleration regions based on the subtraction amount information and update the target rotation speed by the calculated value. Further, the object to be controlled may be a wiper device provided in a vehicle.

Advantages of the Invention

According to the motor control method of the present invention, in a system having the acceleration region and deceleration region between the operation start and end positions of the object to be controlled, the addition amount in the acceleration region is made larger than the subtraction amount in the deceleration region, thereby allowing setting of a target speed that is easy to control.

Further, the constant speed region is provided between the acceleration region and the deceleration region, and the length thereof can be changed. Thus, when an angle is changed at the target speed, a stable target speed can be set. For example, even when the operation angle is changed in the wiper device, the wiper arm can be made to reach the inversion position.

According to the motor control device of the present invention, in a system having the acceleration region and the deceleration region between the operation start and end positions of the object to be controlled, the drive controller that makes the addition amount in the acceleration region larger than the subtraction amount in the deceleration region, thereby allowing setting of a target speed that is easy to control.

Further, the constant speed region is provided between the acceleration region and the deceleration region, and the length thereof can be changed by the drive controller. Thus, when an angle is changed at the target speed, a stable target speed can be set. For example, even when the operation angle is changed in the wiper device, the wiper arm can be made to reach the inversion position.

BRIEF DESCRIPTION OF THE DRAWINGS

FIG. 2 is an explanatory view illustrating a table structure of a parameter storage section;

FIGS. 7A and 7B are explanatory views each illustrating a change in the rotation speed of the motor when the target angle is reduced in the first embodiment, in which FIG. 7A illustrates the change in the rotation speed of the motor in the control according to the first embodiment, and FIG. 7B illustrates the change in the rotation speed of the motor in the control according to the conventional symmetric-type control;

FIGS. 10A to 10C are explanatory views each illustrating a change in the rotation angle of the motor when the target angle is reduced in the control method according to the second embodiment, in which FIG. 10A illustrates a case where a change in the target angle is smaller than the angle of the constant speed region, and FIGS. 10B and 10C illustrate a case where a change in the target angle is larger than the angle of the constant speed region.

DETAILED DESCRIPTION OF THE INVENTION

Embodiments of the present invention will be described in detail below with reference to the drawings. An object of the present embodiments is to control motor rotation to achieve smooth motor operation without a sense of incongruity. Another object of the present invention is to achieve motor drive control under which, for example in a wiper device, a wiper arm to be controlled reaches a target position without fail even when the operation angle of the motor is changed.

(First Embodiment)

Figure 1:
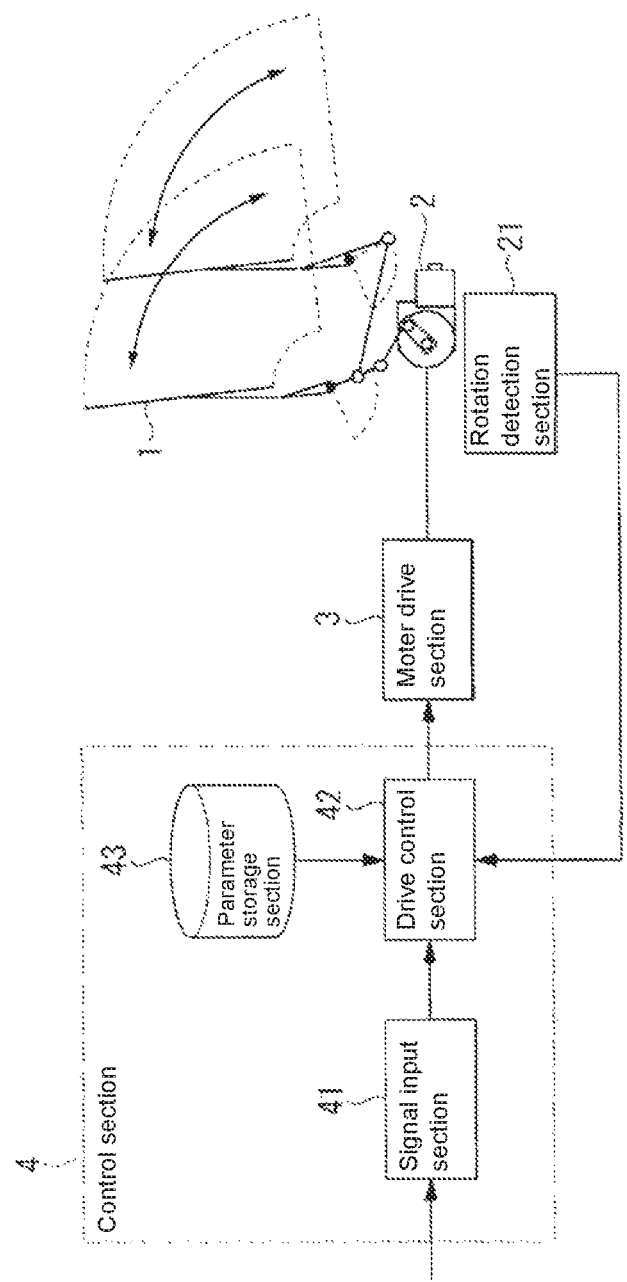
FIG. 1 is an explanatory view illustrating an entire configuration of a wiper system driven by a wiper control method/wiper control device according to a first embodiment of the present invention.

FIG. 1 is an explanatory view illustrating an entire configuration of a wiper system driven by a wiper control method/wiper control device according to a first embodiment of the present invention. In FIG. 1, a reference numeral 1 denotes a wiper arm for wiping a windshield (surface to be wiped) of a car. A reference numeral 2 is a motor for making the wiper arm 1 perform wiping operation. The wiper arm 1 is connected with a rotation shaft of the motor 2 via link mechanism. The wiper arm 1 is reciprocated by switching a rotation direction of the motor 2 between normal rotation and reverse rotation to perform the wiping operation on the windshield.

A reference numeral 21 denotes a motor rotation detection section (position detector). The rotation detection section 21 outputs a signal for detecting a rotation angle of a rotary shaft of the motor 2 (motor rotation angle detection signal). The rotation detection section 21 has a sensor that detects an origin and outputs a pulse according to rotation of the rotary shaft. The sensor that detects the origin outputs, upon detection of the origin, a signal indicating that the origin has been detected. The pulse representing the rotation is output according to a predetermined rotation angle. For example, when one pulse is output every one degree of the rotation angle, it is possible to calculate the rotation angle of the motor rotary shaft by counting the number of output pulses. Thus, by counting the number of pulses generated after the origin detection, it is possible to calculate the absolute rotation angle of the motor 2.

For simplification, it is assumed here that the rotation angle of the rotary shaft of the motor 2 coincides with an operation angle of the wiper arm 1. That is, when the operation angle of the wiper arm 1 ranges from 0 degrees to 150 degrees, the rotary shaft of the motor 2 is reciprocated within a range from 0 degrees to 150 degrees by the normal and reverse rotations of the motor 2. A reference numeral 3 denotes a motor drive section that controls supply power according to a drive instruction so as to drive the motor 2.

A reference numeral 4 denotes a control section. The control section 4 is constituted by a microcomputer. The control section 4 outputs a drive instruction to the motor drive section 3 so as to control the rotation of the motor 2. A reference numeral 41 is a signal input section. The signal input section 41 inputs thereto a signal to be transmitted/received in the car over an intra-car LAN provided in the car, such as a CAN (Controller Area Network) or a LIN (Local Interconnect Network). The signal to be input to the signal input section 41 includes a signal indicating a state of a wiper switch for use in instructing the wiper device to start or stop wiping operation and a signal indicating a speed (low speed, high speed, intermittent, etc.) of the wiping operation. The signal input section 41 further inputs thereto a signal indicating a car speed and a signal indicating an open/close state of a hood.

A reference numeral 42 denotes a drive control section. The drive control section 42 controls the rotation operation of the motor 2 based on the signal input to the signal input section 41 and the motor rotation angle detection signal output from the rotation detection section 21 to thereby control the wiping operation of the wiper arm 1. A reference numeral 43 denotes a parameter storage section. The parameter storage section 43 previously stores patterns of the input signal input to the signal input section 41 and various parameters for motor control in association with each other.

FIG. 2 is an explanatory view illustrating a table structure of the parameter storage section 43. The parameter storage section 43 stores control parameters associated with each input signal pattern. When signals of three systems are input to the signal input section 41, the input signal pattern indicates case classification of the signals of three systems. That is, the signals to be input include a wiper switch signal, a hood open/close signal, and a car speed signal, a state is classified for each signal value. For example, in the first input signal pattern, the wiper switch indicates "Lo" (low-speed wiping operation), the hood open/close signal indicates "close", and the car speed signal indicates 60 km/h or less. Based on such classification, the input signals to be input to the signal input section 41 and control parameters are stored in association with each other previously for all the cases where the operation of the wiper device needs to be controlled.

The parameters for motor control include five parameters: "maximum rotation speed"; "operation start position"; "operation end position"; "addition amount"; and "subtraction amount". The "maximum rotation speed" is a maximum value of the rotation speed of the motor 2 in the swing operation of the wiper arm 1 from a current position or a predetermined position to a target position. Herein, the rotation speed is represented by a rotation number [rpm]. The "operation start position" is a start position of a predetermined operation of the wiper arm 1. Herein, the position of the wiper arm is represented by an angle; a storage position of the wiper arm is set to 0 degrees, and a turning position (upper inversion position) of the wiper arm in the maximum wiping range is set to 150 degrees.

The "operation end position" is an end position of the predetermined operation of the wiper arm 1. For example, the "operation start position" and "operation end position" when the wiper arm is made to perform the wiping operation in the maximum wiping range are 0 degrees and 150 degrees, respectively. The "addition amount" is a rotation speed amount to be added for each control period when the wiper arm 1 is accelerated to the maximum rotation speed. The "subtraction amount" is a rotation speed amount to be subtracted for each control period when the wiper arm 1 is decelerated from the maximum rotation speed.

Figure 3:
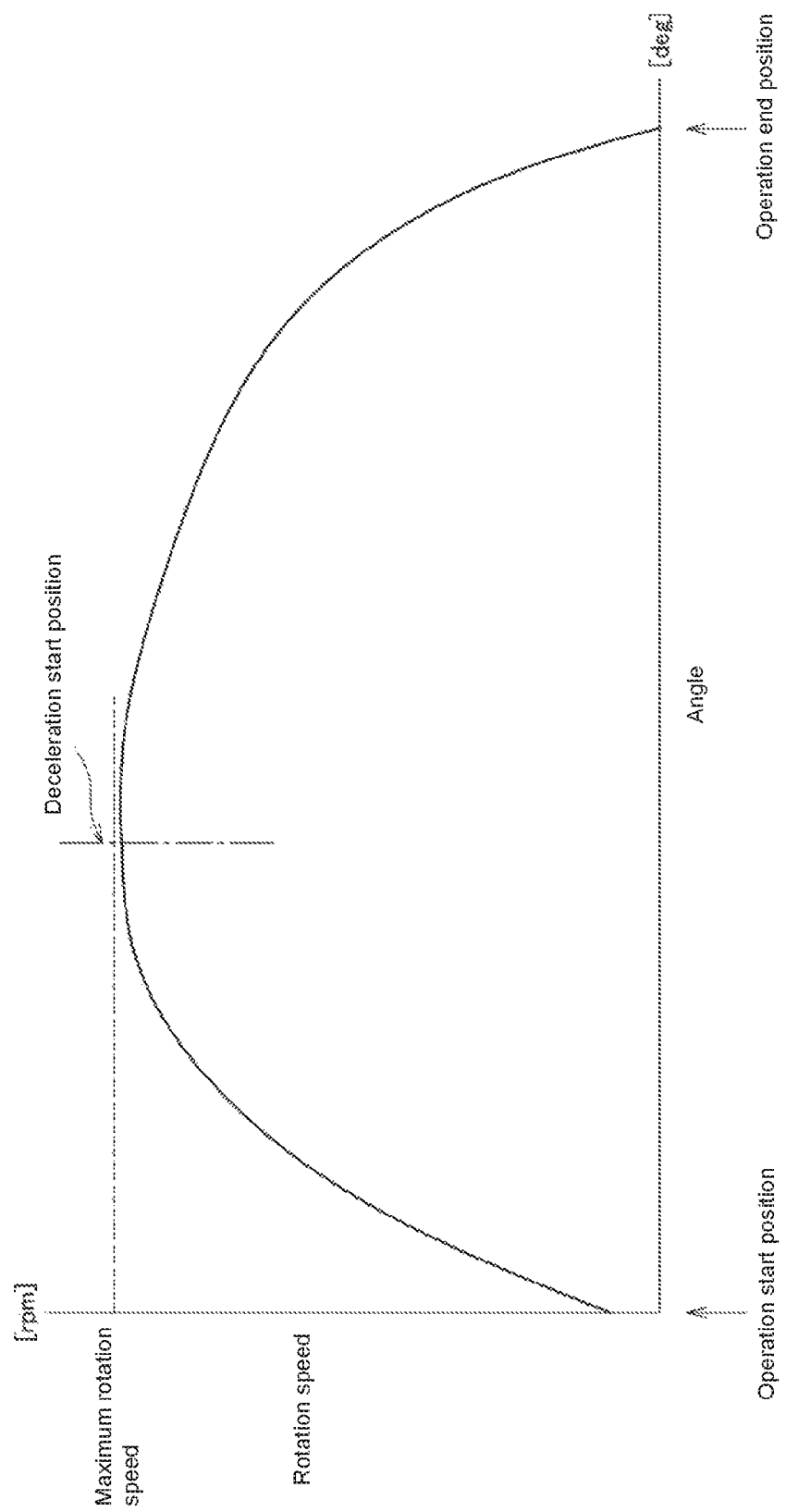
FIG. 3 is an explanatory view illustrating a change in a motor rotation speed in a system according to the first embodiment.

FIG. 3 is an explanatory view illustrating a change in the rotation speed of the motor 2 in the present embodiment. The drive control section 42 of the control section 4 drives the motor 2 in a control mode as illustrated in FIG. 3 to move the wiper arm 1 from the operation start position to operation end position (one-way wiping operation). When the above five parameters (information of the respective maximum rotation speed, operation start position, operation end position, addition amount, and subtraction amount) are specified according to the input signal pattern, the drive control section 42 computes a deceleration start position from the operation start position and operation end position. Then, the drive control section 42 accelerates the rotation speed of the motor 2 such that the rotation speed reaches the maximum rotation speed at an angle corresponding to the deceleration start position. Subsequently, at a time point when the deceleration start position is reached (maximum rotation speed is reached), the drive control section 42 decelerates the rotation speed such that the rotation speed reaches 0 at an angle corresponding to the operation end position.

In the conventional motor control mode, a target speed curve at the acceleration time and that at the deceleration time are approximately symmetric. That is, the curve of FIG. 3 has an approximately symmetric shape. However, as described above, when the target speed curve has the symmetric shape, unevenness may occur in a blade moving speed depending on a condition of a surface to be wiped or due to influence of resistance caused by traveling wind, which may prevent achievement of the smooth wiping operation. Further, in the blade speed control, control is more difficult in the deceleration time where a control object of "blade is stopped at a predetermined position" is set than in the acceleration time and, therefore, finer control is required in the deceleration time.

In the control mode according to the present invention, a change amount in the speed is made different between the acceleration region and the deceleration region such that the acceleration curve has a steeper gradient than the deceleration curve so as to make it easy to perform control for the target speed. That is, a change amount in the speed in the deceleration region (subtraction amount) is made smaller than a change amount in the speed in the acceleration region (addition amount). In the acceleration region, 1/X of a difference between the motor maximum rotation speed and current target speed is added to the current target speed to thereby set the next target speed. On the other hand, in the deceleration region, 1/Y (Y>X) of the above difference is subtracted from the current target speed to thereby set the next target speed. Thus, as illustrated in FIG. 3, the rotation speed of the motor 2 is represented by a curve having an asymmetric shape in which the acceleration curve has a steeper gradient than the deceleration curve. By interchanging the operation start position and operation end position of FIG. 3, it is possible to reciprocate the wiper arm 1 on the windshield.

Figure 4:
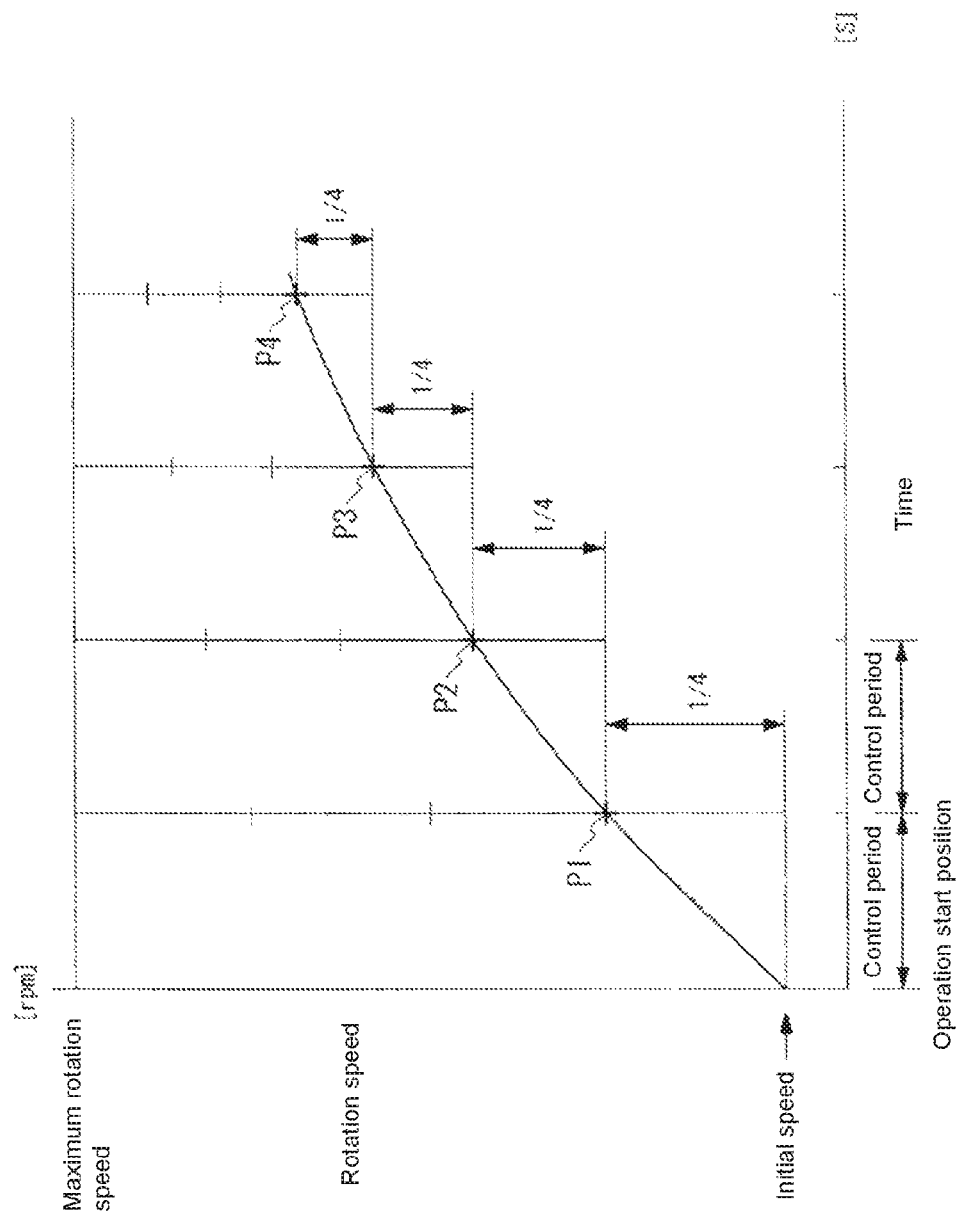
FIG. 4 is an explanatory view illustrating a state where the motor rotation speed is accelerated.

FIG. 4 is an explanatory view illustrating a state where the rotation speed of the motor 2 is accelerated. The drive control section 42 outputs, at the operation start position, a prescribed initial speed value as a command value of the target rotation speed to start rotating the motor 2. Subsequently, when the control period is reached, the drive control section 42 calculates the addition amount based on the maximum rotation speed and current rotation speed (in this case, initial speed value). The calculated addition amount is added to the current target rotation speed to thereby set a new target rotation speed. More specifically, a difference between the maximum rotation speed and current rotation speed (in this case, maximum rotation speed–initial speed) is multiplied by a predetermined addition coefficient (value acquired from the parameter storage section 43, e.g., 1/X) to calculate the addition amount. Then, the calculated addition amount ((maximum rotation speed–initial speed)×1/X) is added to the current target rotation speed to set and update the current target rotation speed to a new target rotation speed (initial speed+(maximum rotation speed–initial speed)×1/X: point P1 illustrated in FIG. 4). In the example of FIG. 4, X is set to 4.

Afterward, at a time point when the next control period is reached, a value obtained by multiplying the difference between the current target rotation speed (in this case, point P1) and maximum rotation speed by ¼ is added to the current target rotation speed to set a new target rotation speed (P2 illustrated in FIG. 4). The same processing is repeated to sequentially set points P3 and P4 as new target rotation speeds and uses these target rotation speeds to control the rotation operation of the motor 2.

On the other hand, after the deceleration start position is reached, a predetermined subtraction amount is subtracted from the current target rotation speed for each control period. More specifically, the difference between the maximum rotation speed and current rotation speed is multiplied by a predetermined subtraction coefficient (value acquired from the parameter storage section 43, e.g., 1/Y) to calculate the subtraction amount. Then, the calculated subtraction amount ((maximum rotation speed–current rotation speed)× 1/Y) is subtracted from the current target rotation speed to set and update the current target rotation speed to a new target rotation speed (current rotation speed–(maximum rotation speed–current rotation speed)×1/Y).

In the control mode according to the present embodiment, Y is set larger than X (Y>X), and in the deceleration region, the rotation operation is controlled with a smaller speed change amount (subtraction amount) than a speed change amount (addition amount) in the acceleration region, as illustrated in FIG. 3. That is, the speed change amount is set larger in the acceleration region to make the gradient of the target speed curve at the acceleration time steeper (make the gradient of the target speed curve at the deceleration time gentler than at the acceleration time). As a result, the wiper arm 1 quickly reaches the maximum speed at the acceleration time and is slowly decelerated at the deceleration time until it stops. Thus, even when the state of the surface to be wiped or traveling wind changes, stable wiping operation (acceleration/deceleration/stop) can be performed, thus allowing achievement of smooth wiping operation without a sense of incongruity.

Figure 5:
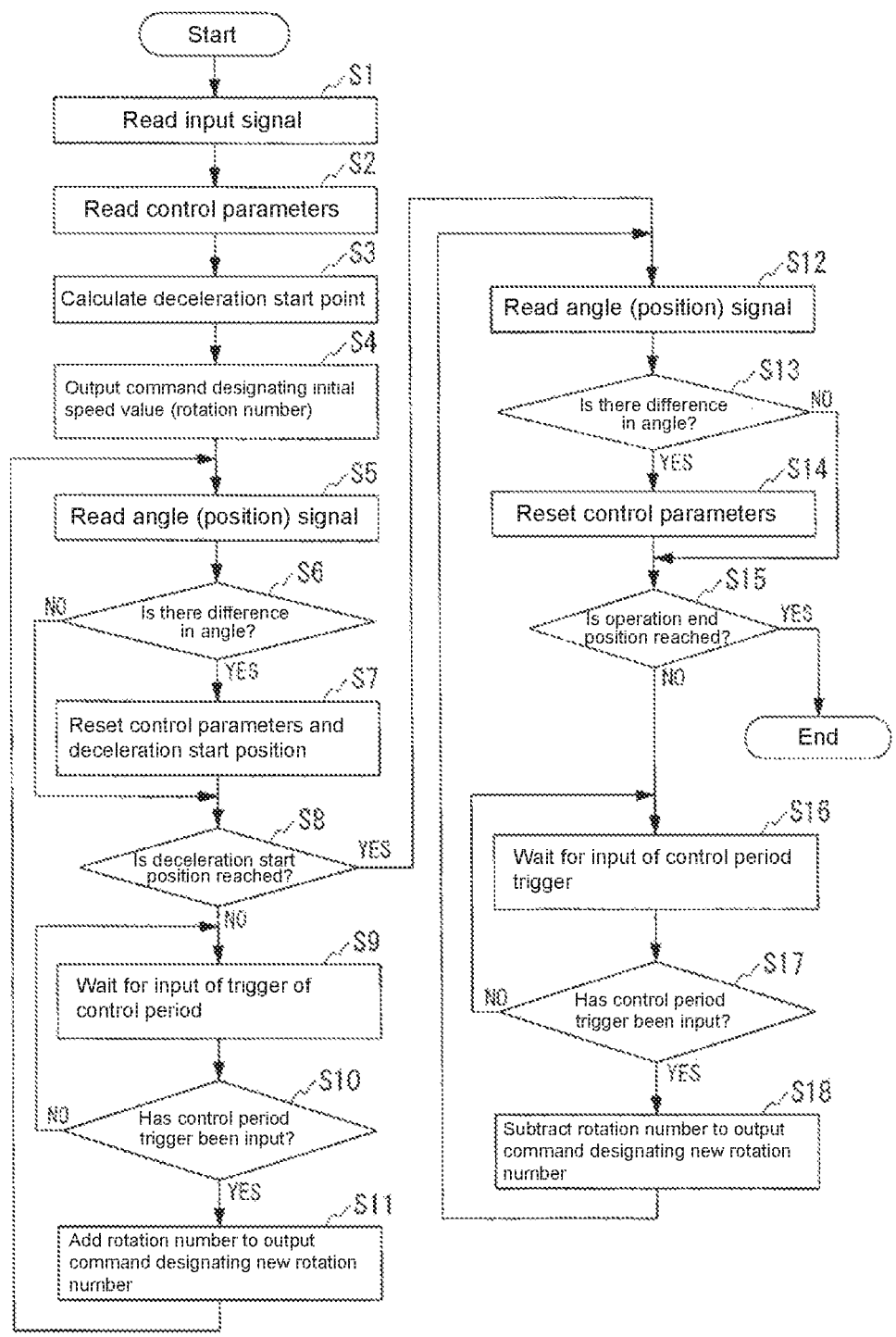
FIG. 5 is a flowchart illustrating a procedure of control processing for the motor in a control method according to the first embodiment.

FIG. 5 is a flowchart illustrating a procedure of control processing for the motor 2 in the control method according to the first embodiment. The processing illustrated in FIG. 5 is executed by the control section 4. As illustrated in FIG. 5, the signal input section 41 of the control section 4 reads an input signal and outputs the read input signal to the drive control section 42 (step S1). The drive control section 42 specifies the pattern of the input signal output from the signal input section 41. The drive control section 42 reads, from the parameter storage section 43, the control parameters associated with the input signal pattern coinciding with the specified input signal pattern (step S2). As the control parameters, the maximum rotation speed "65", operation start position "0", operation end position "150", addition amount "¼" (X=4), and subtraction amount "⅙" (Y=6) are read in this example.

After reading the control parameters in step S2, the drive control section 42 calculates the deceleration start position from the operation start position "0" and the operation end position "150" (step S3). The deceleration start position is set, for example, to an intermediate point ((0+150)/2=75) between the operation start position and operation end position. The drive control section 42 outputs a command to the motor drive section 3 to set the prescribed initial speed value as the target rotation speed (step S4). As a result, the motor 2 starts rotating.

Then, the drive control section 42 reads the signal output from the rotation detection section 21 and counts the number of pulses of the read signal to specify the rotation angle (step S5). The rotation angle specified in step S5 corresponds to a value representing the position of the wiper arm 1. When a signal indicating that the origin has been detected is output from the rotation detection section 21, the drive control section 42 determines whether or not a difference between the current rotation angle specified based on the pulse count and origin is large (step S6).

Figure 6:
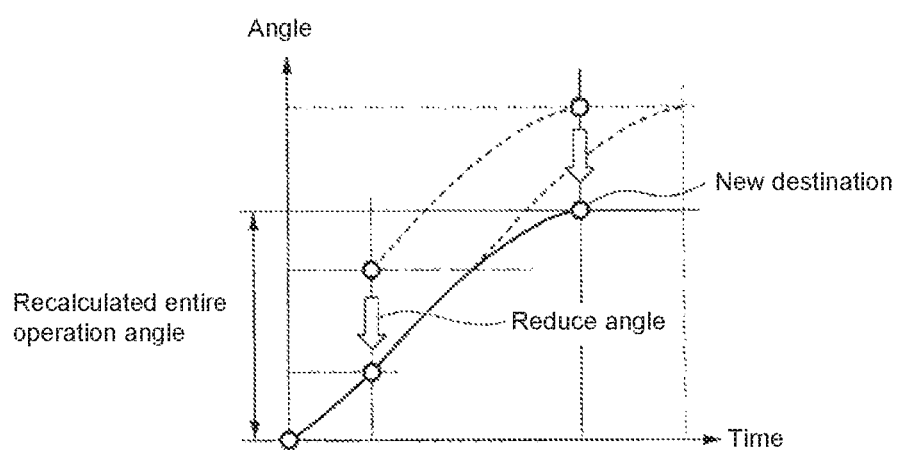
FIGS. 6A and 6B are explanatory views each illustrating recalculation processing when a difference between a currently specified rotation angle and an origin position is large.
Figure 6:
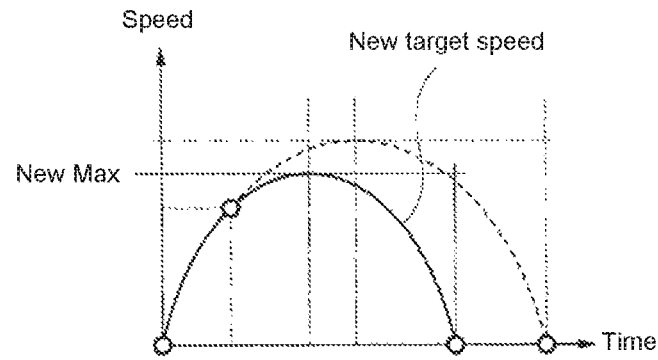

When it is determined in step S6 that the difference between the currently specified rotation angle and origin is large, the drive control section 42 resets the current rotation angle to the origin position and resets the control parameters and deceleration start position (step S7). That is, the drive control section 42 newly sets the operation end position, maximum rotation speed, and deceleration start position through recalculation (see FIGS. 6A and 6B). On the other hand, when the difference between the currently specified rotation angle and origin is small (degree to which no abrupt speed change occurs) or absent, the drive control section 42 does not perform the resetting of the control parameters and deceleration start position.

After steps S6 and S7, the drive control section 42 determines whether or not the specified angle value reaches the deceleration start position (step S8). When it is determined in step S8 that the specified angle value does not reach the deceleration start position, the drive control section 42 waits for input of a trigger of the control period while determining whether or not the trigger is input (steps S9 and S10).

When the trigger of the control period is input, the drive control section 42 adds the addition amount to the current target rotation speed (rotation number) to calculate a new target rotation speed (rotation number). Then, the drive control section 42 outputs a command to the motor drive section 3 to set the calculated target rotation speed value as a new target rotation speed (step S11). The drive control section 42 repeats the processing of steps S5 to S11 until the deceleration start position is reached. Through the processing of steps S5 to S11, the motor 2 reaches the deceleration start position while increasing the rotation speed from the operation start position, as illustrated in FIG. 3.

At the time point when the deceleration start position is reached, the drive control section 42 reads the output signal of the rotation detection section 21 and counts the number of pulses of the read signal to specify the rotation angle (step S12). When a signal indicating that the origin has been detected is output from the rotation detection section 21, the drive control section 42 determines whether or not a difference between the current rotation angle specified based on the pulse count and origin is large (step S13).

When it is determined in step S13 that the difference between the currently specified rotation angle and origin is large, the drive control section 42 resets the current rotation angle to the origin position and resets the control parameters (step S14). That is, the drive control section 42 newly sets the operation end position and maximum rotation speed through recalculation. On the other hand, when the difference between the currently specified rotation angle and origin is small (degree to which no abrupt speed change occurs) or absent, the drive control section 42 does not perform the resetting of the control parameters.

After steps S13 and S14, the drive control section 42 determines whether or not the specified angle value reaches the deceleration end position (step S15). When it is determined in step S15 that the specified angle value does not reach the deceleration end position, the drive control section 42 waits for input of the trigger of the control period while determining whether or not the trigger is input (steps S16 and S17).

When the trigger of the control period is input, the drive control section 42 subtracts the subtraction amount from the current target rotation speed (rotation number) to calculate a new target rotation speed (rotation number). Then, the drive control section 42 outputs a command to the motor drive section 3 to set the calculated target rotation speed value as a new target rotation speed (step S18). The drive control section 42 repeats the processing of steps S12 to S18 until the deceleration end position is reached and stops rotating the motor 2 at a time when the operation end position is reached. Through the processing of steps S12 to S18, the motor 2 reaches the deceleration end position while reducing the rotation speed, as illustrated in FIG. 3.

In the control method according to the first embodiment, the change amount in the speed is made different between the acceleration region and the deceleration region to make the speed addition amount larger than the speed subtraction amount, thereby making the acceleration curve steeper in gradient than the deceleration curve. As a result, the motor 2 quickly reaches the maximum speed at the acceleration time and is slowly decelerated at the deceleration time until it stops.

Thus, even when the state of the surface to be wiped or traveling wind changes, the wiping operation is hardly affected by it, so that stable wiping operation (acceleration/deceleration/stop) can be performed, thus allowing achievement of smooth wiping operation without a sense of incongruity.

(Second Embodiment)

Next, a control method/control device according to a second embodiment of the present invention will be described.

In the second embodiment, the same reference numerals are given to the same parts as in the first embodiment and descriptions thereof will be omitted.

Figure 7:
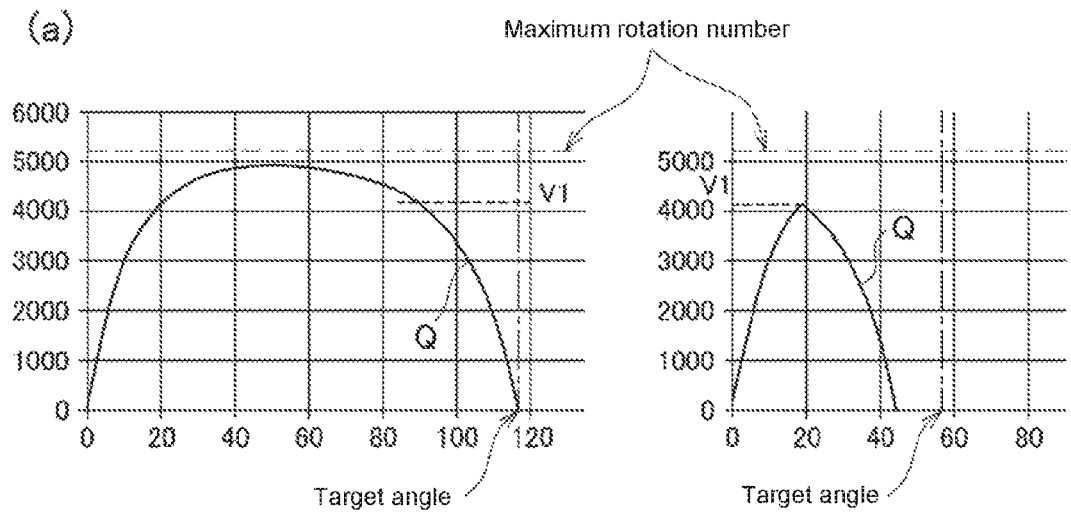
Figure 7:
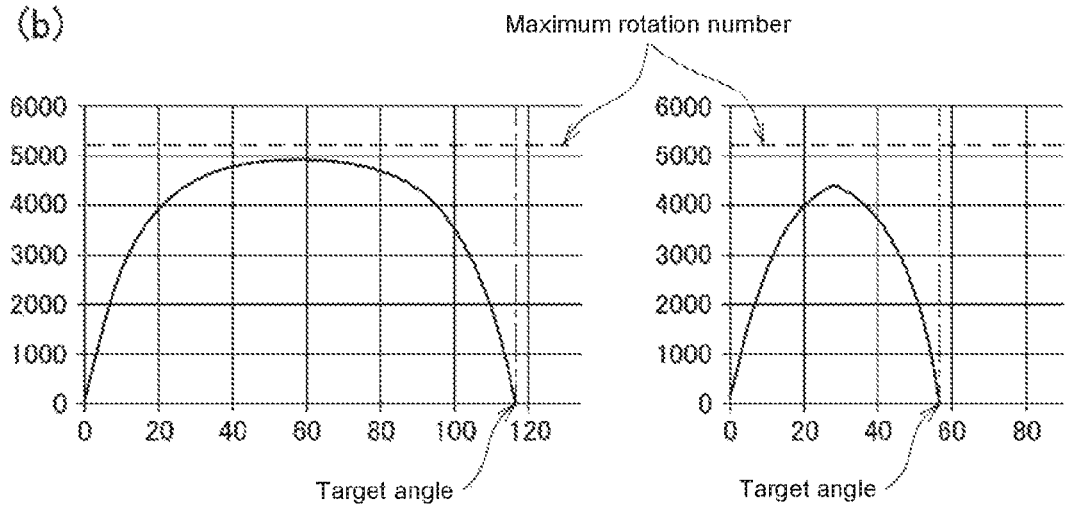

In the above first embodiment, the acceleration curve is made steeper in gradient than the deceleration curve so as to facilitate control. However, in the control mode of the first embodiment, when a target wiping angle is reduced due to influence of snowfall, obstacles, or the like, the target speed may reach 0 before the target angle. FIGS. 7A and 7B are explanatory views each illustrating a change in the rotation speed of the motor 2 when the target angle is reduced in the first embodiment. FIG. 7A illustrates the change in the rotation speed of the motor 2 in the control according to the first embodiment, and FIG. 7B illustrates the change in the rotation speed of the motor 2 in the control according to the conventional symmetric-type control.

As illustrated in FIG. 7B, in a case where the motor rotation speed changes symmetrically in the acceleration and deceleration regions, the speed changes symmetrically even when the changed target angle is reduced, so that the target speed reaches 0 at the target angle as expected. On the other hand, as illustrated in FIG. 7A, in a case where the motor rotation speed changes asymmetrically in the acceleration and deceleration regions, when a rotation speed V1 achieved in the acceleration region starts being reduced in the deceleration region, the motor is controlled along a speed curve of a Q-part of FIG. 7A, with the result that the target speed reaches 0 before the target angle. That is, the wiper blade is stopped and inverted before the target position.

Figure 8:
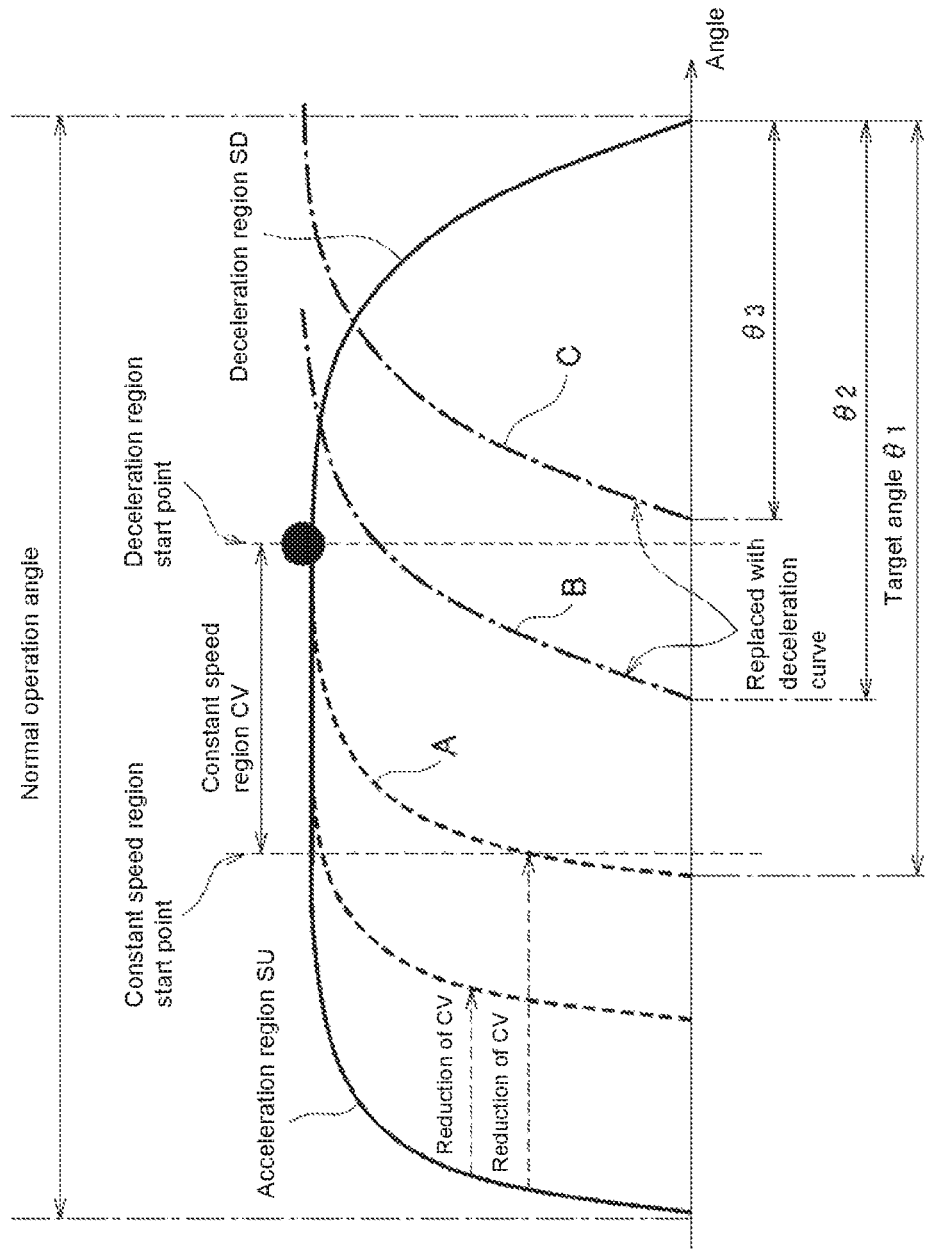
FIG. 8 is an explanatory view illustrating a change in the rotation speed of the motor in a control method according to a second embodiment of the present invention.

In the second embodiment, in the control method in which the speed curve shape is made different between the acceleration region and the deceleration region as in the first embodiment, the following control is carried out so that the wiper arm can reach the target position without fail even when the operation angle of the motor (operation distance of an object to be controlled) changes. FIG. 8 is an explanatory view illustrating a change in the rotation speed of the motor 2 in the control method according to the second embodiment of the present invention.

As illustrated in FIG. 8, in the control method according to the second embodiment, a constant speed region CV is set between an acceleration region SU and a deceleration region SD. In the constant speed region CV, the rotation speed of the motor 2 is set to the maximum rotation speed. A time length of the constant speed region CV can be adequately changed. As indicated by dashed curves in FIG. 8, when a change occurs in the target angle, a length of the constant speed region is changed to absorb an angle change for angle adjustment. The constant speed region CV is set to such a length that can sufficiently absorb the angle change in terms of normal use of the wiper device. Thus, in a daily use, existence of the constant speed region CV allows the wiper arm to reach the inversion position without fail even when the operation angle changes.

On the other hand, as indicated by long dashed short dashed curves in FIG. 8, a case can be assumed where the target angle is reduced to such a degree that the angle change cannot be absorbed by the constant speed region due to a large quantity of snowfall or the like. Such a case cannot be said to be normal operation of the wiper device. In such a case, it is preferable that the wiping operation is slow and that the acceleration curve of the motor 2 is gentle. However, in order to maintain accuracy of the stop position, it is necessary to operate the motor 2 along the same speed curve as in the normal operation. Further, the curve in the acceleration region and curve in the deceleration region are the same as each other, it is possible to prevent the speed from reaching 0 before the target angle even when the operation angle changes. Thus, in the control method according to the second embodiment, when the target angle is reduced to such a degree that the angle change cannot be absorbed by the constant speed region, the curve in the deceleration region, which is gentler than the curve in the acceleration region, is applied to the acceleration region. That is, the same speed curve is used for both the acceleration and deceleration regions to perform control (acceleration curve is replaced with the deceleration curve).

Figure 9:
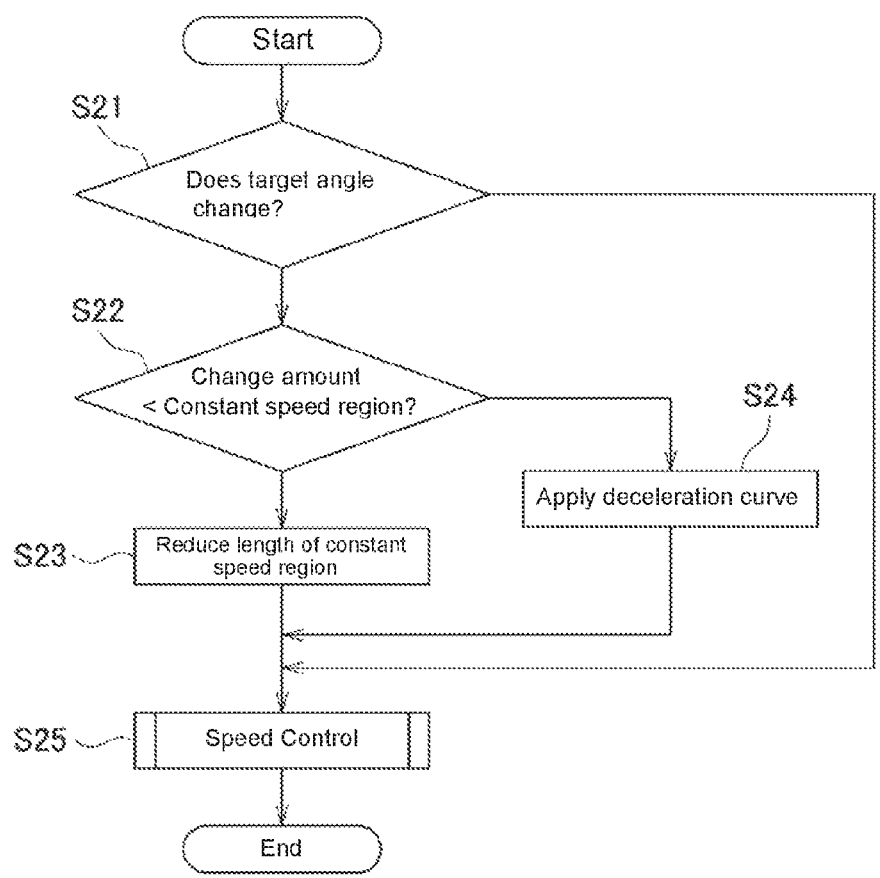
FIG. 9 is a flowchart illustrating a procedure of control processing for the motor in the control method according to the second embodiment.

FIG. 9 is a flowchart illustrating a procedure of control processing for the motor 2 in the control method according to the second embodiment. The control processing of FIG. 9 is also executed by the control section 4 and performed in combination with the control processing of FIG. 5. First, it is determined whether or not the target angle changes (step S1). When the target angle has no change, a processing flow proceeds to step S25, where the same processing as that in FIG. 5 is executed, and this routine is ended.

On the other hand, when the target angle changes, the flow proceeds to step S22. In step S22, it is determined whether or not the change in the target angle exceeds the angle of the constant speed region CV. When it is determined in step S22 that the change in the target angle does not exceed the angle of the constant speed region CV, the flow proceeds to step S23. In step S23, the length of the constant speed region CV is reduced to absorb the angle change for angle adjustment (dashed curves in FIG. 8). After the angle adjustment, the flow proceeds to step S25, where the same processing as that in FIG. 5 is executed, and this routine is ended. On the other hand, when it is determined in step S22 that the change in the target angle exceeds the angle of the constant speed region CV, the flow proceeds to step S24. In step S24, the same speed curve (curve in the deceleration region) is applied to both the acceleration and deceleration regions, and the flow proceeds to step S25. In step S25, rotation speed control is performed based on the changed speed curve.

Figure 10:
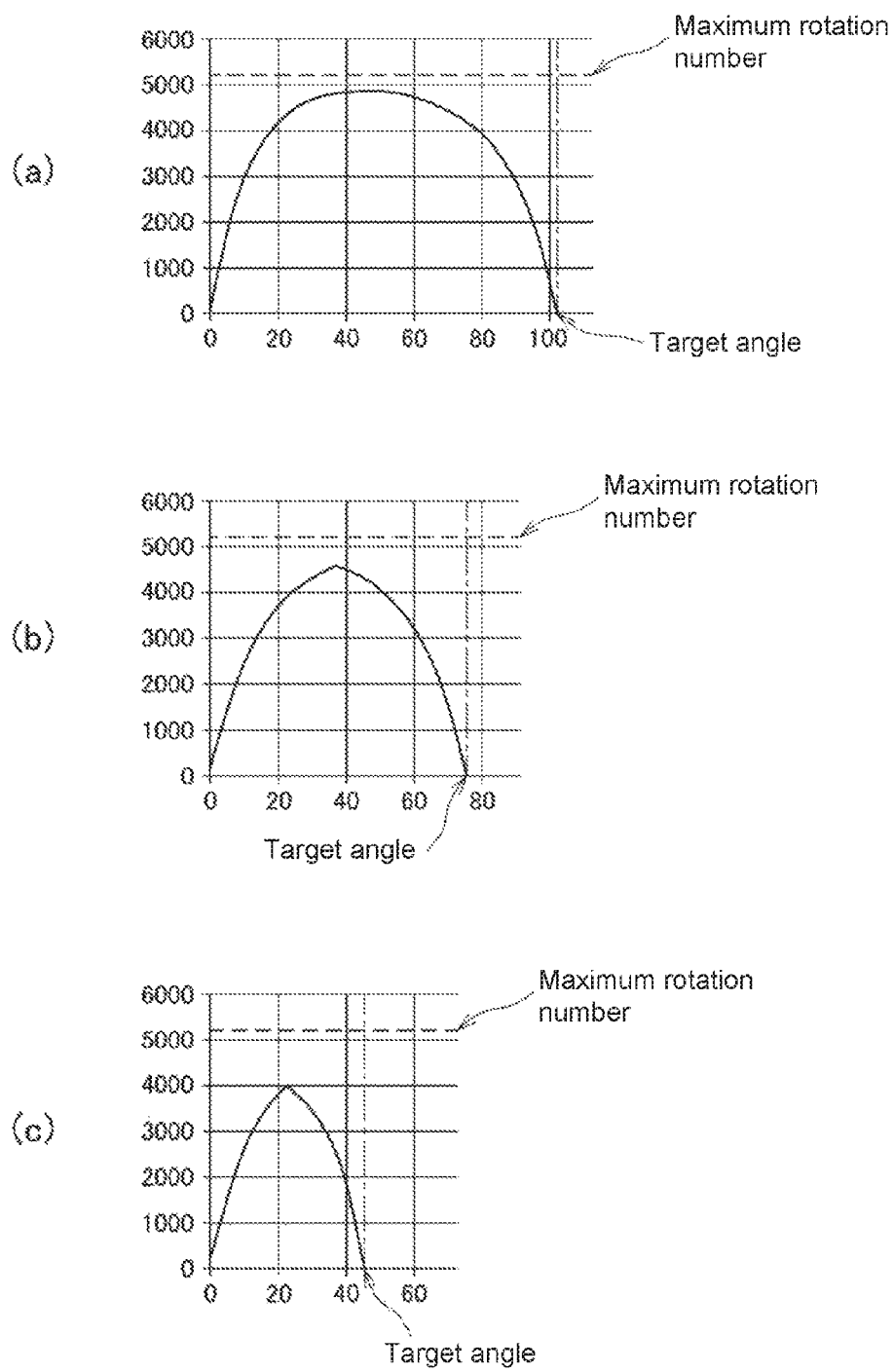

FIGS. 10A to 10C are explanatory views each illustrating a change in the rotation angle of the motor 2 when the target angle is reduced in the control method according to the second embodiment. FIG. 10A illustrates a case where a change in the target angle is smaller than the angle of the constant speed region CV (dashed curve A in FIG. 8: target angle θ1). FIGS. 10B and 10C illustrate a case where a change in the target angle is larger than the angle of the constant speed region CV (long dashed short dashed curve B in FIG. 8: target angle θ2, long dashed short dashed curve C in FIG. 8: target angle θ3). As illustrated in FIG. 10A, although the control method according to the second embodiment adopts a control mode in which the speed curve is made different between the acceleration and deceleration regions, the target speed can stably be maintained even when a change occurs in the target angle, whereby the wiper arm 1 can be made to reach the inversion position without fail. Even when a change in the target angle is large, and the change cannot be absorbed by the constant speed region CV, both the acceleration and deceleration regions are controlled by the gentle deceleration curve, as illustrated in FIGS. 10B and 10C. As a result, even in abnormal conditions, it is possible to make the wiper arm 1 reach the inversion position without fail while stably maintaining the target speed based on the gentle curve.

A program for realizing a function of the control section 4 in FIG. 1 may be recorded in a computer-readable recording medium. Further, the wiper control processing may be performed by loading the program recorded in the recording medium into a computer system and executing it. The "computer system" referred to herein is assumed to include an OS and hardware such as peripheral devices. Further, the "computer-readable recording medium" refers to a portable medium, such as a flexible disk, a photo-magnetic disk, a ROM, a CD-ROM, etc., or a storage device, such as a hard disk, incorporated in the computer system. Furthermore, an example of the "computer-readable recording medium" also includes a medium that stores a program for a predetermined period of time like volatile memory (RAM) in a computer system. For example, a storage element in a computer system serving as a server or a client when the program is transmitted through a network, such as the Internet, or a communication line, such as a telephone line is included in the "computer-readable recording medium".

Further, the program may be transmitted from a computer system that stores the program in a storage device or the like, to another computer system through a transmission medium or transmission waves in the transmission medium. The "transmission medium" that transmits a program refers to a medium having a function of transmitting information like a network (communication network), such as Internet, or a communication line, such as a telephone line. Further, the above program may be provided to realize a part of the function described above. Further, the program may be a so-called difference file (difference program) that can realize the above function in combination with a program already recorded in a computer system.

The present invention is not limited to the above embodiments and may include various changes without departing from the scope of spirit thereof.

For example, in the above embodiments, the present invention is applied to a wiper device that makes the wiper arms and wiper blades on both a driver's side and passenger seat side perform wiping operation by one motor using a link mechanism; alternatively, however, the present invention may be applied to a wiper device that uses two motors to make the wiper arms and wiper blades on both a driver's side and passenger seat side in substantially the same direction. Further, alternatively, the present invention may be applied to an opposing wiping type wiper device that uses two motors mounted symmetrically on the windshield to make the wiper arms and wiper blades on both a driver's side and passenger seat side perform wiping operation in the opposite direction to each other.

In the above embodiments, when a change in the target angle is larger than the angle of the constant speed region CV, the motor 2 is controlled along the deceleration curve;

however, the control curve used in this case is not limited to the deceleration curve. Another control curve, for example, an "abnormal time control curve" gentler than the deceleration curve may be set. Further, it is possible to control the motor 2 along the acceleration curve.

INDUSTRIAL APPLICABILITY

The present invention may be applied not only to the wiper device, but also to a device that controls operation of an object to be controlled through a link mechanism connected to the rotary shaft of the motor. For example, the present invention may be applied to control for operation of an electric tailgate, an electric slide door, an electric power window, or the like provided in the car.

REFERENCE SIGNS LIST

1: Wiper arm
2: Motor
3: Motor drive section
4: Control section
21: Rotation detection section
41: Signal input section
42: Drive control section
43: Parameter storage section
A: Dashed curve
B: Long dashed short dashed curve
CV: Constant speed region
SD: Deceleration region
SU: Acceleration region
V1: Rotation speed

The invention claimed is:

1. A motor control method to be used in a system, the system operating an object to be controlled by a motor and being configured such that an acceleration region and a deceleration region for the operation of the object to be controlled are set between operation start and end positions of the object to be controlled, the method comprising:
when the object to be controlled is moved from the operation start position to the operation end position, calculating a deceleration start position from which the deceleration region is started from information of the operation start and end positions,
in the acceleration region, calculating an addition amount to be added to a current target rotation speed of the motor from a difference between a maximum rotation speed of the motor and a current rotation speed of the motor and addition amount information concerning the rotation speed of the motor, and accelerating the motor so as to be rotated at the target rotation speed until it is detected that the deceleration start position is reached while the target rotation speed is sequentially updated by the addition amount,
in the deceleration region, at a time point when it is detected that the deceleration start position is reached, calculating a subtraction amount to be subtracted from the current target rotation speed of the motor from a difference between the maximum rotation speed of the motor and current rotation speed of the motor and subtraction amount information concerning the rotation speed of the motor, and decelerating the motor so as to be rotated at the target rotation speed until it is detected that the operation end position is reached while the target rotation speed is sequentially updated by the subtraction amount, and setting the addition amount information and the subtraction amount information such that the addition amount in the acceleration region is larger than the subtraction amount in the deceleration region.

2. The motor control method according to claim 1, further comprising:
providing a constant speed region over which the maximum rotation speed is not changed between the acceleration region and the deceleration region, the constant speed region being changeable in length.

3. The motor control method according to claim 2, further comprising:
when an operation distance from the operation start position to the operation end position is changed, and the change amount does not exceed the constant speed region, subtracting the change amount of the operation distance from the constant speed region.

4. The motor control method according to claim 2, further comprising:
when an operation distance from the operation start position to the operation end position is changed, and the change amount exceeds the constant speed region, updating the target rotation speed by the same change amount both in the acceleration and deceleration regions.

5. The motor control method according to claim 4, further comprising:
when the change amount of the operation distance from the operation start position to the operation end position exceeds the constant speed region, calculating the target rotation speed of the motor in each of the acceleration and deceleration regions based on the subtraction amount information, and updating the target rotation speed by the calculated value.

6. The motor control method according to claim 1, wherein
the object to be controlled is a wiper device provided in a vehicle.

7. A motor control device provided in a system, the system operating an object to be controlled by a motor and being configured such that an acceleration region and a deceleration region for the operation of the object to be controlled are set between operation start and end positions of the object to be controlled, the motor control device comprising:
a parameter storage that stores parameters required for the motor control, the parameters including information of the operation start position and the operation end position, maximum rotation speed information of the motor, and addition amount and subtraction amount information of the rotation speed;
a position detector that detects a position of the object to be controlled; and
a drive controller that acquires the parameters from the parameter storage and controls a drive state of the motor, wherein
the drive controller calculates, when the object to be controlled is moved from the operation start position to the operation end position, a deceleration start position from which the deceleration region is started from the information of the operation start and end positions,
in the acceleration region, the drive controller calculates an addition amount to be added to a current target rotation speed of the motor from a difference between the maximum rotation speed of the motor and a current rotation speed of the motor and the addition amount information concerning the rotation speed of the motor and accelerates the motor so as to rotate the motor at the target rotation speed until it is detected that the deceleration start position is reached while updating the target rotation speed sequentially by the addition amount,
in the deceleration region, at a time point when it is detected that the deceleration start position is reached, the drive controller calculates a subtraction amount to be subtracted from the current target rotation speed of the motor from a difference between the maximum rotation speed of the motor and current rotation speed of the motor and the subtraction amount information concerning the rotation speed of the motor and decelerates the motor so as to rotate the motor at the target rotation speed until it is detected that the operation end position is reached while updating the target rotation speed sequentially by the subtraction amount, and
the drive controller sets the addition amount information and the subtraction amount information such that the addition amount in the acceleration region is larger than the subtraction amount in the deceleration region.

8. The motor control device according to claim 7, wherein the drive controller is further configured such that:
a constant speed region over which the maximum rotation speed is not changed is provided between the acceleration and deceleration regions of the motor, and
a length of the constant speed region can be changed by the drive controller.

9. The motor control device according to claim 8, wherein
when an operation distance from the operation start position to the operation end position is changed, and the change amount does not exceed the constant speed region, the drive controller subtracts the change amount of the operation distance from the constant speed region.

10. The motor control device according to claim 9, wherein
when an operation distance from the operation start position to the operation end position is changed, and the change amount exceeds the constant speed region, the drive controller updates the target rotation speed by the same change amount both in the acceleration and deceleration regions.

11. The motor control device according to claim 10, wherein
when the change amount of the operation distance from the operation start position to the operation end position exceeds the constant speed region, the drive controller calculates the target rotation speed of the motor in each of the acceleration and deceleration regions based on the subtraction amount information and updates the target rotation speed by the calculated value.

12. The motor control device according to claim 7, wherein
the object to be controlled is a wiper device provided in a vehicle.

* * * * *